June 10, 1969     H. S. HOFFMAN, JR     3,449,039

NON-PARALLEL SURFACED LIGHT DEFLECTOR-SELECTOR

Filed July 2, 1965

INVENTOR
HARRY S. HOFFMAN, JR.

BY Earl C. Hancock

ATTORNEY

United States Patent Office 3,449,039
Patented June 10, 1969

3,449,039
NON-PARALLEL SURFACED LIGHT-
DEFLECTOR SELECTOR
Harry S. Hoffman, Jr., Saugerties, N.Y., assignor to International Business Machines Corporation, Armonk, N.Y., a corporation of New York
Filed July 2, 1965, Ser. No. 469,148
Int. Cl. G02f 1/24; G02b 5/30, 27/28
U.S. Cl. 350—157                                     8 Claims

ABSTRACT OF THE DISCLOSURE

A light deflector-selector capable of separating ordinary and extraordinary polarized light into distinct beams of their respective polarization. The input beam is introduced into an elongated isotropic block which has a pair of thin birefringent plates embedded therein. One polarization component is reflected from one plate while the other complement is reflected from a surface beyond that plate. The two reflected rays are then directed against a second embedded plate which has an optic axis opposite the first plate. The output consists of compensated light beams which appear at the far end of the elongated block.

---

Figure 1:
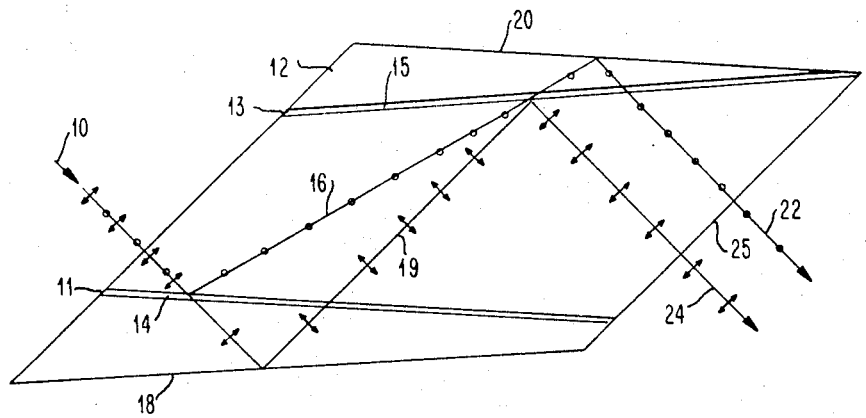

This invention relates to optical devices for selecting or separating light rays or beams on the basis of polarization thereof. More particularly, this invention relates to devices for separating light generated by a common source where the light is either of a first polarization or of a polarization orthogonal with respect thereto. Typical such sources which would be useful for the present invention are shown in the IBM Journal of Research and Development article entitled "A Fast, Digital-Indexed Light Deflector" by W. Kulcke et al., volume 8, No. 1, January 1964 issue beginning at page 64. Further, polarized light separators have been known and a device for this purpose is shown in the copending application Ser. No. 469,068, filed Sept. 21, 1968, now pending, entitled "Polarized Light Deflector-Selector" by Harry S. Hoffman, Jr. and James Lipp, which application is assigned to the same assignee as the present application.

The present invention utilizes optical principles and concepts in a relatively simple, generally elongated structural configuration to provide electro-optic light beam deflection. The various light paths through devices in accordance with the present invention are self-compensated so as to be substantially equal even for different wave lengths of radiation which may be caused to pass therethrough. The invention requires a minimum of birefringent materials to permit large separation or overlapping of the ordinary and extraordinary light at the exit from a particular stage. The present invention is relatively simple to fabricate.

Briefly, the present invention advantageously requires isotropic material for majority of the structure which includes two birefringent plate and two totally reflective surfaces with the plates and surfaces non-parallel to each other in an elongated sandwich arrangement with the plates being located between the surfaces. The space between the surfaces would preferably be filled with an isotropic material which would substantially match the higher index of refraction of the birefringent material. One plate is illuminated by the light source such as is mentioned hereinbefore which would reflect one polarization of light and pass the other polarization for reflection by one of the surfaces. The two reflected beams will converge towards the second surface which, in conjunction with the second plate, would cause re-reflection of the beams into two parallel output paths. The device permits substantially "in line" separation and, in one embodiment, produces output beams parallel to the input beam. The device can operate in the reverse for combining input beams into a single output beam.

Accordingly, it is an object of this invention to provide a polarized light separator having path length compensation for light so separated.

Another object of this invention is to advantageously utilize the optical characteristics of birefringent and isotropic materials to accomplish separation of polarized light.

It is yet another object of this invention to provide separation of polarized light based upon the orientation of the polarization.

It is still another object of this invention to provide switching of a light beam from a common source to a selected output in a manner readily adaptable to control by electronic circuitry.

A further object of this invention is to permit separation of light from a common source with the output light being totally separated or partially over-lapped.

A still further object of this invention is to provide substantially in-line separation of polarized light from a common source.

Figure 2:
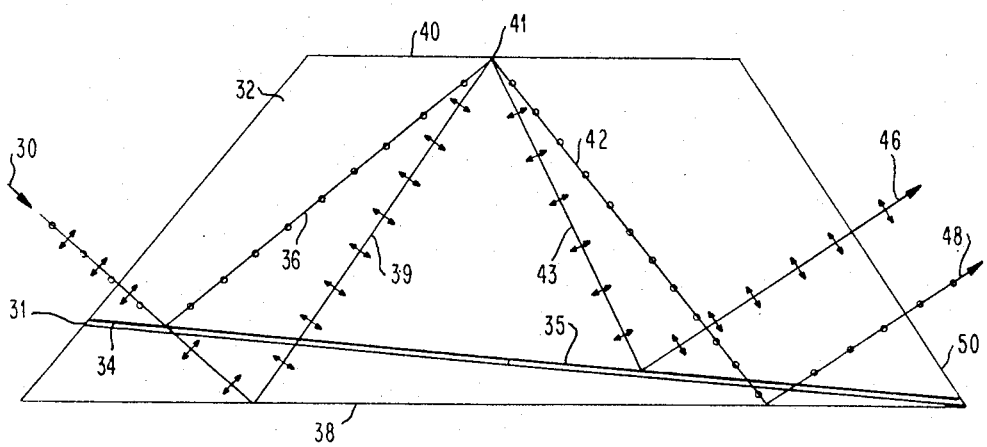

The foregoing and other objects, features and advantages of the present invention will be apparent from the following more particular description of preferred embodiments of the invention as illustrated in the accompanying drawing in which:

FIGURE 1 is a polarized light separator in accordance with this invention in which the output beams are produced parallel to the input beam, and FIGURE 2 is another embodiment according to this invention in which only one plane is required for the birefringent plates.

Wherever the term "reflection" is employed in this application, it may be generally taken as meaning total internal reflection although where applicable, ordinary mirror reflection should be recognized as an alternative.

Light source 10 of FIGURE 1 generates either or both of two polarized beams or rays of light. One polarization is represented by dots while the orthogonal or 90° polarization is represented by double headed arrows. A block of isotropic material 12 has two planar slots 11 and 13 therein with plates or films of birefringent material 14 and 15 positioned in each slot. The optic axis of plates 14 and 15 is perpendicular to the incident ray thereto and either in the plane of the drawing or normal to the plane of the drawing. Whichever orientation of the optic axis is assumed by plate 14, the orthogonal orientation will apply to plate 15. Thus, one polarization of light from source 10 will be reflected to 16 by plate 14 while the other polarization passes through plate 14 to be reflected by surface 18. This splitting of the beam from source 10 is realized by employing an isotropic material for block 12 which has an index of refraction which at least approximates the higher index of refraction of the birefringent material of which plates 14 and 15 are constituted.

Reflected rays 16 and 19 are shown as being directed so as to intersect at a point on plate 15 although it is to be understood that actual intersection at such a point is not an essential requirement for this invention. That it, it should be recognized that at least some separation of rays 16 and 19 upon arrival at plate 15 is to be considered to be within the spirit of this invention. Since the optic axis of plate 15 is orthogonal with respect to the optic axis of plate 14, ray 16 will be passed by plate 15 and reflected by surface 20 into output path 22. Conversely, reflected ray 19 will be totally reflected by plate 15 into output path 24. Output paths 22 and 24 are not only parallel to one another but, as they appear at exit surface 25, have travelled a substantially equal distance with respect to source 10.

It should be appreciated that block 12 need not even be a block at all. In fact, surfaces 18 and 20 could be totally reflective plates or totally reflective coatings of films on some supporting material with plates 15 and 16 being supported therebetween. The space between the plates and surfaces occupied by block 12 in the drawing could be filled with an isotropic fluid such as oil. The actual fabrication of block 12 could be accomplished by cutting slots 11 and 13 in a block of isotropic material and sliding in plates 14 and 15 of thin, polished birefringent material having one very flat surface on the top of plate 14 and bottom of plate 15. Alternatively, block 12 could be constructed by laminating plates 14 and 15 between three appropriately shaped layers. It should be noted that plate 14 is parallel to surface 20 while plate 15 is parallel to surface 18, plates 14 and 15 being arranged convergent towards the left in the drawing while surfaces 18 and 20 are arranged convergent toward the right.

The FIGURE 2 embodiment of this invention uses two totally reflective surfaces 38 and 40 which are parallel to one another. The two birefringent plates 34 and 35 are arranged in an abutting configuration in slot 31 with plate 34 forming the left side of a plane and plate 35 forming the right side. This plane converges towards the lower totally reflective surface 38. Similarly to plates 14 and 15 the optic axis of plate 34 will be oriented with its optic axis perpendicular to light from source 30 and either in the plane of the drawing or normal to it. Whichever orientation is chosen for plate 34, the other orientation will be employed for plate 35.

Ray or beam 36 reflected by plate 34 and ray 39 reflected by surface 38 are shown as intersecting at point 41 and both are totally reflected by surface 40, ray 36 reflecting into ray 42 while ray 39 reflects into ray 43. As with FIGURE 1, rays 36 and 39 could be incident to surface 40 with some separation therebetween. Plate 35 then totally reflects ray 43 into output ray 46 while ray 42 passes through plate 35 to be reflected by surface 38 into output ray 48. With respect to exit surface 50, the paths taken by light from source 30 to output paths 46 and 48 are substantially equi-distant.

Although the parallel output rays 46 and 48 are not parallel to rays produced by source 30, the FIGURE 2 structure can be constructed in a flatter configuration than the FIGURE 1 device and is somewhat easier to fabricate since only one cut or slot 31 through block 32 is needed to position both plates 34 and 35. Construction by lamination is also easier for FIGURE 2. For both FIGURE 1 and FIGURE 2, the lamination construction could be simplified by depositing a coating or film of birefringent material on blocks or slabs of isotropic material. As with FIGURE 1, the FIGURE 2 configuration could be constructed by suspension of plates or surfaces or films coated on supporting material with an isotropic fluid or gas filling the space between the surfaces 38 and 40. In both embodiments, distortion due to refraction is automatically corrected as long as the exit angle is the same as the initial incident angle. The path length compensation of the preferred embodiments of this invention permits a single focus of the light from the source for either output. The advantages of this invention are substantially the same as those discussed in the copending application entitled "Polarized Light Deflector-Selector" by Harry S. Hoffman, Jr. and James Lipp mentioned hereinbefore.

While the invention has been particularly shown and described with reference to preferred embodiments thereof, it will be understood by those skilled in the art that the foregoing and other changes in form and details may be made therein without departing from the spirit and scope of the invention.

What is claimed is:
1. A polarized light deflector comprising
   a source for providing light of a first polarization and of a second polarization orthogonal with respect to said first polarization,
   an isotropic medium,
   a first reflective surface and a birefringent plate located in said medium with said plate defining an acute angle with said first surface, said source illuminating said plate so that light therefrom of said first polarization will be totally reflected by said plate while light of said second polarization will pass through said plate and is reflected by said first surface back through said plate so as to intersect at a point the reflected light of said first polarization,
   means including a second reflective surface and a second birefringent plate located in said medium to reflect light of said first and second polarization in proximity of said point of intersection, said means for reflecting the light so received into output paths of substantially equal length with respect to said source.

2. Apparatus in accordance with claim 1 wherein the optic axis of said second birefringent plate is oriented orthogonally with respect to the optic axis of said first birefringent plate.

3. Apparatus in accordance with claim 2 wherein said second plate is located at least in proximity to the point of intersection for totally reflecting light of said second polarization into a first output path while passing light of said first polarization, said second surface receiving the light passed by said second plate and reflecting said light into a second output path parallel to said first output path.

4. Apparatus in accordance with claim 2 wherein said second surface receives and totally reflects the light at least in proximity to the point of intersection, said second plate being in the plane of said first plate and receiving the light from said second surface and reflecting the light of said second polarization into a first output path while permitting the light of said first polarization to pass therethrough to be reflected by said first surface into a second output path parallel to said first output path.

5. A polarized light deflector comprising
   a source for providing light of a first polarization and of a second polarization orthogonal with respect to said first polarization,
   first and second birefringent plates in spaced apart but converging relation,
   first and second totally reflective surfaces in spaced apart relation but converging oppositely from said plates and having said plates located therebetween,
   said first plate being parallel to said second surface and said second plate being parallel to said first surface,
   said first plate receiving the light from said source for totally reflecting light therefrom of said first polarization while passing light so received of said second polarization for reflection by said first surface,
   said first plate, said first surface and said source being positioned so that light reflected by said first plate and first surface will converge at a point of intersection at said second plate,
   said second plate reflecting into a first output path light of the said second polarization at least in proximity to said point and permitting passage therethrough of light of said first polarization for reflection thereof by said second surface into a second output path parallel to said first output path.

6. Apparatus in accordance with claim 5 wherein an isotropic material having an index of refraction substantially the same as the higher index of refraction of said first and second plates fills the space between said surfaces including said plates.

7. A polarized light deflector comprising
a source for providing light of a first polarization and of a second polarization orthogonal with respect to said first polarization,
first and second totally reflective surfaces in parallel but spaced apart relation,
first and second birefringent plates positioned between said surfaces in a plane convergent with the plane of said first surface,
said first plate receiving the light from said source for totally reflecting light therefrom of said first polarization and for permitting passage therethrough of light of said second polarization for reflection by said first surface,
said source, said first plate, and said first surface positioned so that light reflected by said first plate and said first surface will converge at a point of intersection at least in proximity to said second surface for reflection thereby onto said second plate,
said second plate totally reflecting into a first output path light of said second polarization into a first output path and permitting passage therethrough of light of said first polarization for reflection by said first surface into a second output path parallel to said first output path.

8. Apparatus in accordance with claim 7 wherein an isotropic material having an index of refraction substantially the same as the higher index of refraction of said birefringent plates fills the space including said plates between said surfaces.

References Cited

UNITED STATES PATENTS

| | | | |
|---|---|---|---|
| 2,447,828 | 8/1948 | West | 350—157 |
| 2,449,287 | 9/1948 | Flood | 350—152 |

FOREIGN PATENTS 918,102  10/1946  France.

DAVID SCHONBERG, *Primary Examiner.*

P. R. MILLER, *Assistant Examiner.*

U.S. Cl. X.R.

350—147, 152, 169